United States Patent [19]
Feltrop

[11] 4,265,368
[45] May 5, 1981

[54] HOPPER FOR MECHANICAL SEED PLANTERS

[76] Inventor: Floyd L. Feltrop, 203 E. Shawnee, Paola, Kans. 66071

[21] Appl. No.: 972,695

[22] Filed: Dec. 26, 1978

[51] Int. Cl.³ ............................................. A01C 7/18
[52] U.S. Cl. ........................................ 221/10; 111/34; 111/91; 221/235
[58] Field of Search .................. 111/91, 25, 34, 35, 111/36, 51, 74, 77, 89, 90, 91; 222/56; 221/233, 234, 235, 10, 174

[56] References Cited

U.S. PATENT DOCUMENTS

| | | | |
|---|---|---|---|
| 534,361 | 2/1895 | Courtney | 221/235 |
| 806,032 | 11/1905 | Wertz et al. | 221/235 X |
| 814,182 | 3/1906 | Anderson et al. | 221/235 |
| 834,993 | 11/1906 | Paul | 221/200 |
| 844,932 | 2/1907 | Grooters | 221/265 |
| 2,053,390 | 9/1936 | Bateman et al. | 221/138 |
| 2,354,717 | 8/1944 | Treciokas | 222/56 X |
| 3,026,001 | 3/1962 | Landgral | 221/42 |
| 3,077,290 | 2/1963 | Rehder | 222/56 |
| 3,162,153 | 12/1964 | Schulz | 111/51 |
| 3,308,774 | 9/1967 | Keeton | 221/217 |
| 3,329,310 | 7/1967 | Ramsay | 221/235 |
| 3,872,805 | 3/1975 | Kolk | 111/2 |
| 3,913,503 | 10/1975 | Becker | 111/77 |
| 3,982,661 | 9/1976 | Feltrop | 221/235 |
| 4,061,094 | 12/1977 | Cary et al. | 111/89 |

*Primary Examiner*—James R. Feyrer
*Attorney, Agent, or Firm*—Fishburn, Gold and Litman

[57] ABSTRACT

A hopper for mechanical seed planters comprises an upper and a lower reservoir shaped for retaining seed therein, and a valve mounted between the reservoirs to selectively permit the seed to flow under gravitational forces from the upper to the lower reservoir. The lower reservoir is rotatably mounted in the hopper, and is rotated in synchronization with the planting speed of the planter. The bottom of the lower reservoir has at least one metering aperture therethrough, and a circularly shaped groove which is concentric with the lower reservoir's axis of rotation, and extends through the metering aperture. An arm is pivotally connected with the upper reservoir, and includes a tip portion which tracks in the circular groove. A stationary base plate is disposed directly below the reservoir bottom, and includes a discharge aperture which is circumferentially aligned with the metering aperture. The arm tip is positioned directly above the discharge aperture, whereby rotation of the lower reservoir sequentially aligns the metering and discharge apertures for accurate seed planting without abrading the seed.

1 Claim, 7 Drawing Figures

HOPPER FOR MECHANICAL SEED PLANTERS

BACKGROUND OF THE INVENTION

This invention relates to hoppers, and in particular, to a hopper for mechanical seed planters.

Mechanical seed planters are well known in the field of agricultural implements, and a variety of different designs have been developed in an attempt to achieve fast and accurate planting. One type of seed planter design, which is illustrated in the Schulz U.S. Pat. No. 3,162,153, comprises an apparatus which regularly drops the seeds from a metering device into an open furrow, and then covers the furrow. A different type of planter arrangement is a punch planter, and includes a mechanism which positively inserts the seed to the ground, such as by punches, as exemplified in my U.S. Pat. No. 3,982,661. Because the last mentioned type of planter design positively inserts the seeds into the ground, this type of mechanism has proven quite successful in increasing percentage germination and emergence of the plant and seed, thereby alleviating the need for excess seed planting, cutting, and the like, as well as reducing seed costs. However, heretofore, there has not been available a hopper which is capable of consistently metering seed to the planting wheel of a positive insertion, punch-type planter, so as to achieve accurate and reliable planting, without damaging the seed.

SUMMARY OF THE INVENTION

The principal objects of the present invention are: to provide a hopper for mechanical seed planters which accurately and reliably plants the seeds; to provide such a hopper which reliably plants the seed at increased planting speeds; to provide such a hopper which will not abrade or otherwise damage the seed during planting; to provide such a hopper which is particularly adapted for use in conjunction with a punch-type planter; to provide such a hopper which is simple and durable, yet sufficiently sophisticated to evenly space the seeds; to provide such a hopper having a rotating base plate and arm arrangement for positive seed metering; to provide such a hopper having upper and lower seed reservoirs, and a valve therebetween for achieving controlled, non-clogging seed flow; to provide such a hopper having an arm with a scrapper portion thereof to prevent seed from being inadvertently discharged from the hopper; to provide such a hopper having a rotating bottom with a groove therein in which the arm tracks for accurate seed discharge; to provide such a hopper having a detachable discharge plate with a thickness substantially commensurate with the diameter of the seed to be planted for accurately planting one seed at a time; and to provide such a hopper which is economical to manufacture, efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
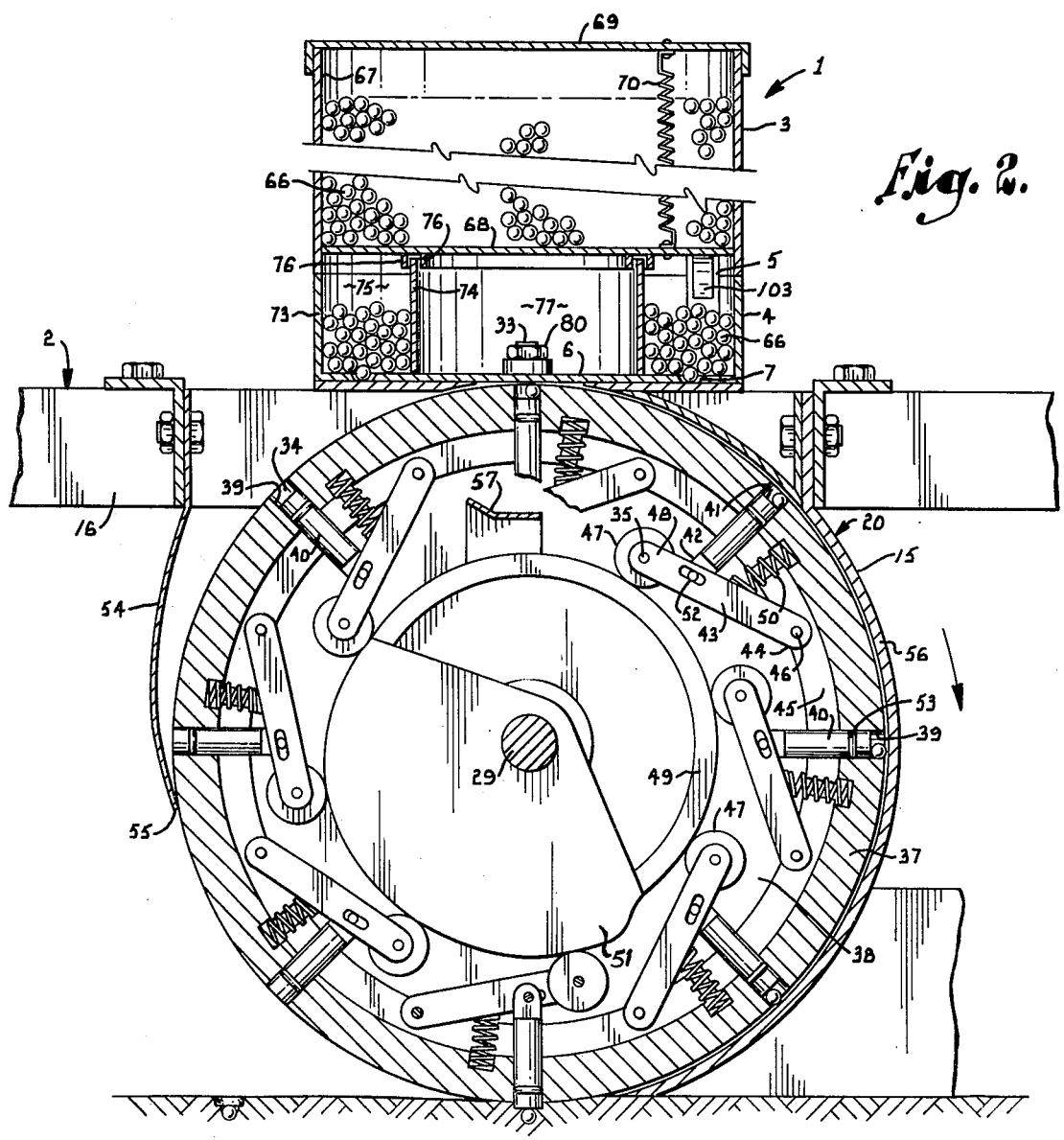
FIG. 2 is an enlarged, vertical cross sectional view of the hopper, and a planting wheel portion of the mechanical seed planter.

For purposes of description herein, the terms "upper", "lower", "right", "left", "rear", "front", "vertical", "horizontal", and derivatives thereof shall relate to the invention as oriented in FIG. 2, however, it is to be understood that the invention may assume various alternative orientations, except where expressly specified to the contrary.

The reference numeral 1 generally designates a hopper for mechanical seed planters 2. The hopper 1 comprises an upper and a lower reservoir 3 and 4 respectively, both of which are shaped for retaining seed therein. A valve 5 (FIG. 2) is mounted between the seed reservoirs 3 and 4, and selectively permits the seed to flow under gravitational forces from the upper reservoir into the lower reservoir. The lower reservoir 4 is rotatably mounted in the hopper 1, and is rotated in synchronization with the planting speed of the planter 2. The bottom 6 of the lower reservoir 4 has at least one metering aperture 7 therethrough, and a circularly shaped groove 8 (FIG. 3) which is concentric with the lower reservoir's axis of rotation, and extends through the metering aperture 7. An arm 9 is pivotally connected with the upper reservoir 3, and includes a tip portion 10 which tracks in the circular groove 8. A stationary base plate 11 is disposed directly below the lower reservoir bottom 6 and includes a discharge aperture 12 which is circumferentially aligned with the metering aperture 7. The arm tip 10 is positioned directly above the discharge aperture 12, whereby rotation of the lower seed reservoir 4 sequentially aligns the metering and discharge apertures 7 and 12 respectively for accurate seed planting without abrading the seed.

Figure 1:
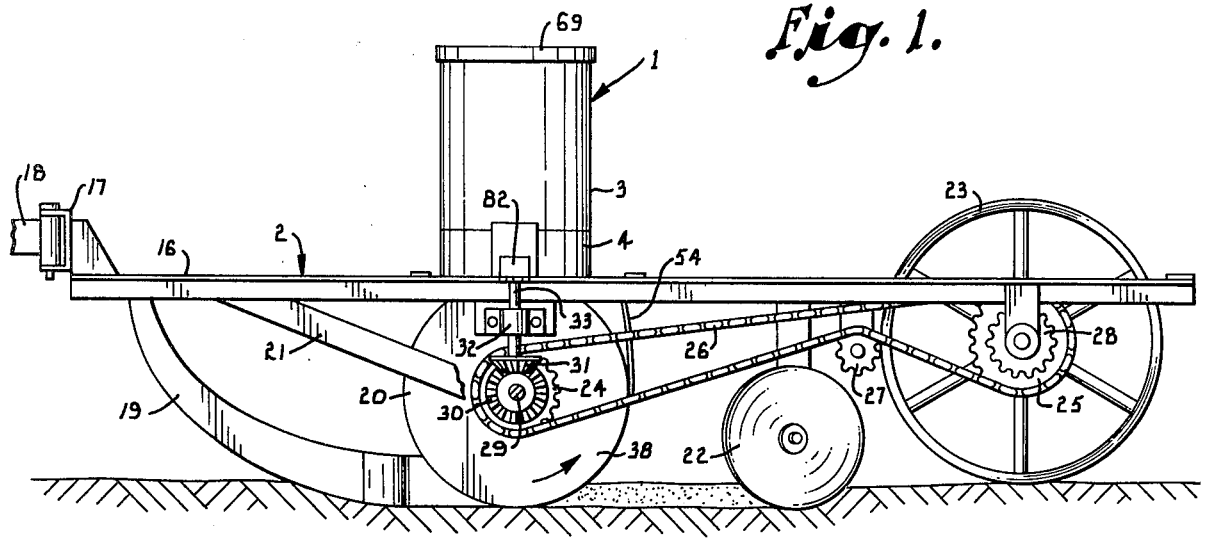
FIG. 1 is a side elevational view of a hopper embodying the present invention, shown attached to a mechanical seed planter.

The present hopper 1 may be used in conjunction with a variety of different types of mechanical seed planters, but is particularly well adapted for use with a punch-type seed planter, such as that shown in the illustrated figures and generally designated by the reference numeral 2. The illustrated seed planter 2 includes a frame 16 (FIG. 1) having a hitch 17 for attachment to the draw bar of an agricultural vehicle, such as a tractor, or the like (not shown). A conventional furrow cutting runner 19 having an arcuate configuration is attached to the forward portion of the frame 16, and serves to open a furrow into which the seed is inserted. A planting wheel 20, which is described in greater detail hereinafter, is rotatably mounted in the frame 16 in a position directly behind the furrow cutting runner 19. An angle brace 21 is connecting between the frame 16 and the planting wheel 20, and serves to securely interconnect the two members. The hopper 1 selectively presents seeds to the planting wheel 20, which in turn, positively inserts the seeds into the soil. A pair of discs 22 are attached to and depend from the frame 16 at a point spaced rearwardly of the planting wheel, and serve to cover over the planted seed and cut furrow. A ground engaging drive wheel 23 is rotatably mounted on the frame 16 at a point rearwardly of the discs 22, and is operatively connected with the planting wheel 22 and rotates the same. In this example, the planting wheel 20 and the drive wheel 23 are each provided with a sprocket 24 and 25 respectively, and are interconnected by a roller chain 26. An idler sprocket 27 is attached to the frame between the two sprockets 24 and 25 and adjusts the slack in the chain 26. The planting wheel 20 and/or ground engaging wheel 23 may be provided with a variable speed reducing mechanism to adjust the rotational speed of the drive wheel 23 with respect to the speed at which the seed planter is drawn across the ground. In the illustrated example, a smaller sprocket 28 is attached to the drive wheel 23 and is adapted to engage the roller chain 26 to achieve variable speed reduction of the planting wheel 20. The forward sprocket 24 is operably connected with the drive wheel 23, and rotates the same as the seed planter 2 is drawn over the ground. A shaft 29 is attached to the sprocket 24, extends laterally thereof, and includes a bevel gear 30 mounted on the shaft. A mating bevel gear 31 is rotatably mounted on the frame 16 by a bearing 32 and a vertical shaft 33, and rotates the lower seed reservoir 4.

The illustrating wheel 20 (FIG. 2) includes an outer disc 37, a circular back plate 38, and is mounted on the shaft 29 for rotation with respect to the frame 16. The disc 37 includes a plurality of circumferentially spaced, radially oriented bores 39, in which a punch or plunger 40 is slidably mounted. The plungers 40 are retracted into the disc 37 to form a cavity 34 in which a seed may be received, and are extended to positively insert the seed placed in the cavity into the ground. In the illustrated example, the disc 37 includes eight plungers 40 which are equidistantly spaced about the periphery of the disc. Each of the plungers 40 includes an outer end 41 which is adapted to abut with the seed, and an inner end 42 which is connected with a mechanism which selectively controls the extension and retraction of the plunger. In this example, the inner end 42 of each plunger 40 is attached to an arm 43, which is a cam follower. The outer end 44 of the arm 43 is disposed in an annularly shaped groove 45 on the interior surface of the disc, 37 and is pivotally retained therein by a pin 46.

A roller 47 is rotatably mounted in the other end 48 of the arm 43, by a pin 35 and is urged outwardly against a cam member 49 by resilient means, such as the illustrated coil spring 50. The cam 49 is stationary with respect to the disc 37, and includes an outwardly extending lobe 51 which urges the arm 43 and plunger 40 radially outwardly to insert the seed into the ground. The inner end 42 of the plunger 40 is attached to the arm 43 by a pin and elongated slot arrangement 52 which allows the plunger 40 to freely reciprocate in the bore 39. A seal 53 is disposed between the plunger 40 and the side wall of the bore 39 to form a secure seal therebetween, such that the interior of the planting wheel can be filled with a liquid lubricant. A scrapper 54 is mounted on the frame 16 and includes a sharp free end 55 which abuts against the outer peripheral surface of the disc 37, and scraps mud, and other debris from the same.

The cam 49 is shaped so as when the plungers 40 approach the area of the scrapper end 55, the plunger outer ends 41 are positioned substantially coextensive with the outer peripheral surface of the disc 37, such that the plunger outer ends are also scrapped of foreign material. An arcuately shaped housing 56 is attached to the frame 16 on the forward side of the planting wheel 20 and mates with the outer peripheral surface of the disc 37 to close the bore cavities 34 until they are disposed adjacent to the ground to insert the seed thereinto. The cam 49 selectively reciprocates the plungers 40, and in the orientation illustrated in FIG. 2, retracts the first and second uppermost plungers to their fully retracted position to form the seed receiving cavity 34. The cam 49 retains the plungers in the fully extended position, until they reach the lobe 51, wherein the roller 47 and plunger 40 are urged outwardly, such that the outer end 41 of the plunger extends from the outer surface of the planting wheel 20 and positively inserts the seed into the ground. As the cam roller 47 rotates past the lobe 51, the cam is shaped to retract the plunger, so that the outer end 41 thereof is positioned substantially coextensive with the outer surface of the disc 37, and the scrapper 54 will engage and remove all foreign matter therefrom. When the roller reaches approximately the eleven o'clock position (as oriented in FIG. 2), the cam surface is shaped to allow the plunger 40 to retract to its fully retracted position. A channel or guide member 57 is attached to the upper portion of the cam 49 and serves to insure full retraction of each of the plungers 40. The ends of the pins 35 which retain the rollers 47 in the arm 43, extend outwardly of the sides of the arms, and are abuttingly engaged by the guide member 57 as they rotate by it. The guide member 57 pulls the pin 35, roller 47 and arm 43 inwardly such that the plunger 40 is in the fully retracted position, and the roller 47 abuts against the cam surface.

The hopper 1 is mounted on the frame 16 directly above the planting wheel 20, and is designed to accurately meter a selected number of seeds 66 into each disc cavity 34 as it approaches the hopper. The illustrated hopper 1 has a substantially cylindrical shape, and the upper seed reservoir 3 includes a stationary side wall 67 and bottom 68 to retain the seed therein. A removable top or closure 69 mates with the upper free edge of the side wall 67, and is resiliently retained in place by a coil spring 70 which extends between the closure 69 and the reservoir bottom 68. The lower seed reservoir 4 includes an outer side wall 73 positioned directly below the upper reservoir side wall 67, and an inner side wall 74 which is spaced radially inwardly of the outer side wall 73 and forms an annularly shaped channel 75 thereinbetween. The upper free edge of the outer side wall 73 is positioned adjacent to the lower edge of the upper reservoir side wall 67, and the upper free edge of the inner side wall 74 is positioned between a pair of flanges 76. The flanges 76 depend from and are attached to the lower surface of the upper reservoir bottom 68, and form a seal to prevent the seeds from escaping from the channel 75 into the interior portion 77 of the lower seed reservoir.

Figure 3:
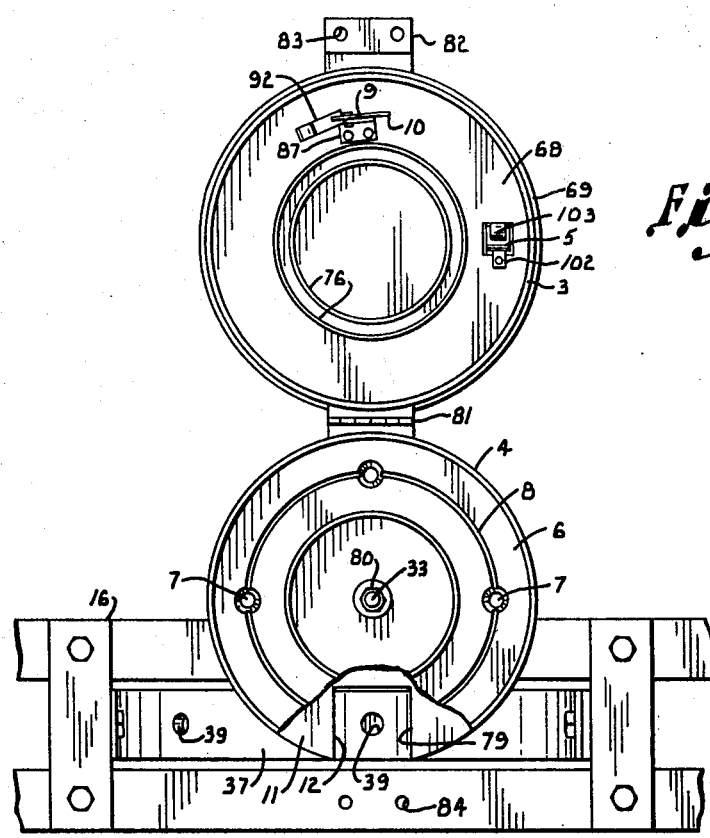
FIG. 3 is a top plan view of the hopper shown in a partially disassembled condition, with portions thereof broken away to reveal internal construction.

As best illustrated in FIG. 3, the base plate 11 is fixedly attached to the frame 16 and is disposed in a generally horizontally oriented plane. The center of the base plate 11 is positioned slightly outwardly of the side of the frame 16 and includes an aperture therethrough for receiving the vertical drive shaft 33 therethrough to facilitate attachment of the lower seed reservoir bottom 6 to the vertical drive shaft. The illustrated base plate 11 is circular, and the discharge aperture 12 has a substantially square configuration which extends through and inwardly of the periphery of the base plate, and is positioned directly above the uppermost portion of the planting wheel 20. The length of the parallel sides 79 of the discharge aperture 12 is substantially commensurate with the width of the planting wheel disc 37, such that the seed receiving cavities 34 and the bores 39 are positioned in line with the groove 8 and the metering aperture 7.

Figure 4:
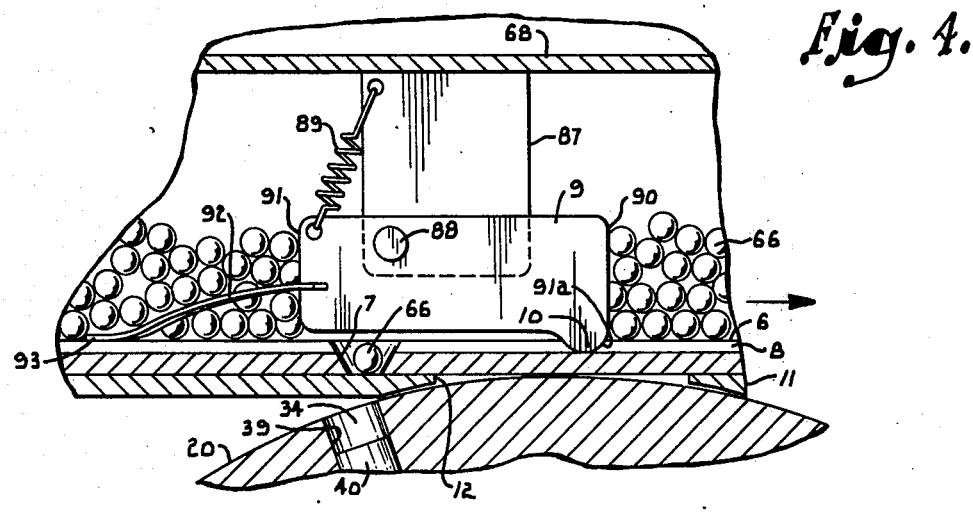
FIG. 4 is an enlarged, fragmentary vertical cross sectional view of the hopper, particularly showing an arm portion thereof having a tip for urging seed outwardly through a discharge aperture.

The lower seed reservoir 4 is disposed directly above the base plate 11, and is removably attached to the vertical shaft 33 by suitable fastening means, such as the illustrated nut and threaded shaft end arrangement 80. In this example, the shaft 33 is provided with a shoulder (not shown) on which the lower seed reservoir 4 sets. Rotation of the vertical shaft 33 by translation of the seed planter rotates the lower seed reservoir 4, such that the metering apertures 7 pass over the discharge aperture 12 and deposit seeds into the seed receiving cavities 34 of the plunger bores 39 which are in alignment therewith. The groove 8 is disposed radially equidistantly between the inner and outer side walls 74 and 73 respectively of the lower seed reservoir, and extends through or intersects the center of each metering aperture 7. In this example the bottom 6 of the lower reservoir 4 contains four metering apertures 7 therethrough which are evenly spaced 90 degrees apart. It is to be understood, however, that the number of metering apertures 7 can be varied in accordance with the desired spacing between the planted seeds, and the number of bores in the planting wheel 20. As best illustrated in FIG. 4, the metering apertures are preferably frustroconical in shape to facilitate transfer into the bores 39, with the smaller diameter thereof slightly larger than that of a selected type of seed. Also, the thickness of the bottom 6 is preferably substantially commensurate with the diameter of a selected type of seed, such that a single seed is dispensed from the hopper at each metering aperture alignment. The hopper is provided with a plurality of removable lower reservoirs 4, having a bottom 6 of various thickness to be used with the size of the seed to be planted. For example, if a relatively large seed is to be planted such as corn or peas, the operator selects a lower reservoir 4 with a fairly thick bottom 6, which is substantially the same size or slightly thicker than the diameter of the seed. For smaller seeds, such as milo, the operator selects a lower reservoir having a thinner bottom. If the operator desires to dispense more than one seed per metering aperture alignment, he simply selects a lower reservoir having a bottom thickness and metering aperture size which will receive the selected number of seeds therein. The above described arrangement allows the operator to plant a variety of different size seeds without changing the planting wheel 20. The bores 39 in the planting wheel 20 are preferably sized to receive therein the largest seed to be normally planted in the particular area of use, and metering is achieved by the hopper.

The upper seed reservoir 3 has one side thereof attached to the base plate 11 by a hinge member 81 (FIG. 3), whereby the upper and lower seed reservoirs may be swung apart as illustrated in FIG. 3. The other side of the upper seed reservoir 3 is attached to the frame 16 by a bracket 82 having vertically disposed apertures 83 therethrough and mating apertures 84 in the frame to receive suitable fasteners therethrough. In this manner, the upper seed reservoir 3 is attached to the frame 16 in a stationary fashion, while the lower seed reservoir 4 rotates with the shaft 33 therebeneath.

The arm 9 is mounted in the hopper 1 in a stationary manner with respect to the lower reservoir 4, and includes a tip 10 which rides or tracks in the groove 8. As best illustrated in FIG. 4, the arm 9 is pivotally attached to a bracket 87 which is connected with and depends from the bottom 68 of the upper seed reservoir 3. The arm 9 is attached to the bracket 87 by a pin 88, and resilient means, such as the illustrated coil spring 89, extends between the bracket 87 and the end of the arm 9 opposite the tip 10, such that the tip 10 is resiliently urged into and retained in the groove 8. The arm tip 10 is positioned directly above the center of the discharge aperture 12, such that when the planting wheel bores 39 approach and reach their fully upwardmost position, and are aligned with an associated metering aperture 7, the tip urges the seed 66 in the metering aperture outwardly into the seed receiving portion 34 of the plunger bore. The tip 10 is located at the trailing end 90 of the arm, and includes an arcuately shaped lower edge 91a which has a diameter between that of the larger and smaller ends of the metering aperture 7. Because of the shape of the tip edge 91a and metering aperture 7, and the selection of the lower reservoir with a thickness substantially commensurate with the thickness of the seed, the tip gently, but firmly urges the seed into the seed receiving cavities 34. Unlike the snap action of prior art planters, this arrangement alleviates damage to the seed, even at high planting speeds. The leading end 91 of the arm 9 includes a scrapper 92 connected therewith. The scrapper 92 has a free end 93 which is positioned over the groove 8, and is resiliently urged against the upper surface of the lower reservoir bottom 6 to prevent more than a preselected number of seeds from being discharged from the hopper during each metering aperture alignment. The illustrated scrapper 92 is constructed of a leaf spring material which is pretensed in a position to urge the free end 93 against the bottom 6. The scrapper free end 93 engages those seeds which are disposed in and/or directly above the groove 8, and directs the same upwardly and rearwardly away from the discharge aperture 12 by the action of the rotating seeds in the lower seed reservoir.

Figure 5:
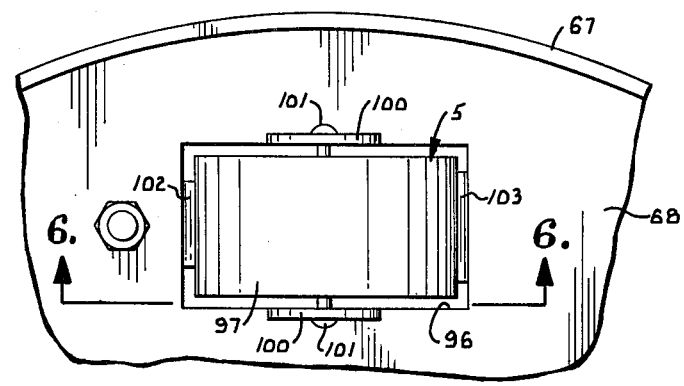
FIG. 5 is an enlarged, fragmentary, top plan view of the hopper, particularly showing a valve portion thereof in a closed position.
Figure 6:
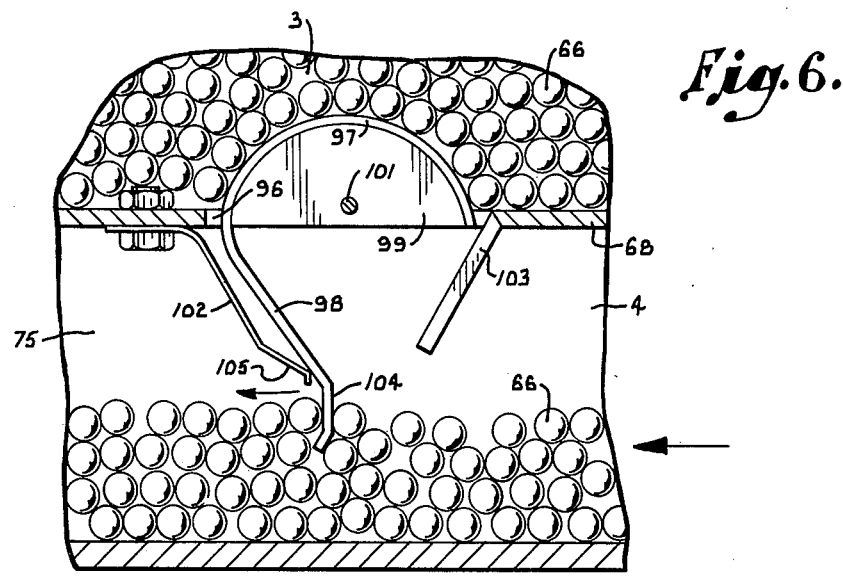
FIG. 6 is a side elevational view of the valve shown in the closed position.
Figure 7:
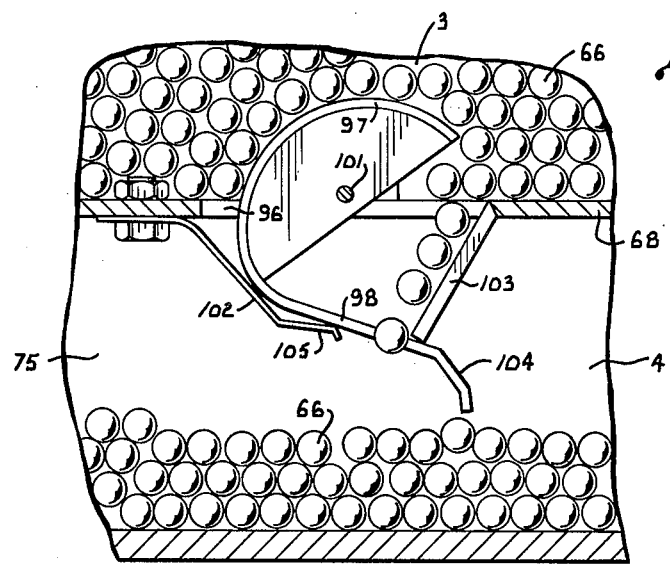
FIG. 7 is a side elevational view of the valve shown in an open position.

The valve 5 is mounted in the bottom 68 of the upper reservoir 3, and maintains the level of the seed in the lower reservoir 4 to a height below and spaced apart from the upper reservoir bottom 68. The illustrated valve 5 is mechanical in nature, and is mounted in a substantially rectangularly shaped aperture 96 in the bottom of the upper reservoir. As best illustrated in FIGS. 5–7 inclusive, the valve includes an arcuately shaped upper portion 97 which is generally disposed in the upper seed reservoir, above the bottom 68, and an integrally innerconnected lower portion 98 which extends into the seed channel 75. The valve 5 includes a pair of side walls 99 which are pivotally interconnected to the upper reservoir bottom 68 by a pair of laterally spaced brackets 100 and a pin 101. Resilient means retains the valve 5 in a normally open position, as illustrated in FIG. 7, whereby the seeds may flow under gravitational forces from the upper reservoir to the lower reservoir 4. The valve 5 may be provided with a cover or shroud (not shown) which covers the top of the arcuately shaped upper portion 97 and abuts with the seeds, such that the upper and lower valve portions 97 and 98 rotate freely therebeneath. The shroud (not shown) preferably includes an aperture at the free end of the upper portion having a shape substantially similar to the full opening of the valve as shown in FIG. 7 to allow the seeds to flow through the valve. In the illustrated structure, a leaf spring 102 has one end thereof attached to the bottom 68, and the other end abuttingly engaged with the lower portion 98 of the valve, and rotates the same in a counterclockwise direction. The lower end 105 of the leaf spring is bent at an angle to the main body in the trailing direction of reservoir rotation to insure constant contact with the valve lower portion, and application of force to a point thereon spaced apart from the pin 101 to insure accurate and reliable opening and closing. A portion of the reservoir bottom 68 is bent downwardly into the lower reservoir 4 to form a stop 103 which engages the valve lower portion 98 and prevents further counterclockwise rotation (as viewed in FIGS. 6 and 7). As the lower reservoir 4 fills with seed, the upper surface of the seeds approaches the lower end 104 of the valve and eventually engages or abuts the same. The frictional forces developed between this abuttment overcomes the resilient force applied to the valve by spring 102 and rotates the same in a clockwise direction (as oriented in FIGS. 6 and 7), thereby positioning the same in a closed position as illustrated in FIG. 6. In this manner, the valve 5 maintains the level of seed in the lower reservoir 4 at a height below and spaced apart from the upper reservoir bottom 68 for improved metering accuracy and consistency. It has been determined that maintaining a depth of seed of approximately one inch in the channel 75 provides sufficient weight to consistently discharge the seeds, without clogging the hopper or causing damage to the seeds.

In use, the operator first selects a lower reservoir which has a bottom thickness substantially commensurate with the diameter of the seed to be planted, as previously described herein, and assembles the same on the vertical drive shaft 33. Next, the closure 69 is removed from the upper seed reservoir 3, seed is poured into the same, and the lid 69 is replaced. As the seed planter 2 is drawn across the ground, the wheel 23 is rotated by engagement with the ground, which in turn rotates both the planting wheel 20 and the lower reservoir 4 through the sprocket and roller chain arrangement. The seed disposed in the upper seed reservoir 3 is stationary and flows into the lower seed reservoir 4 under gravitational forces, until the level in the latter has reached the predetermined height, and the valve 5 is closed. The seed in the lower seed reservoir 4 rotates with the lower reservoir, thereby alleviating abrading the seed by contact with the reservoir sides and bottom, and insuring an even level of seed in the channel 75. The seed in the channel 75 flows downwardly, and is ultimately deposited into the metering apertures 7 under gravitational forces. As the seed disposed in the metering apertures 7 approaches the discharge aperture 12, the scrapper 92 removes the excess seeds on top of the seed disposed in the metering aperture, and the latter is then positioned directly below the arm 9 and in-line with the discharge aperture. The rotation of the planting wheel 20 and the lower reservoir 4 is synchronized, such that during the time that the seed in the metering aperture 7 is positioned over the discharge aperture 12, the former is in-line with the seed receiving cavity 34 of the plunger bore 39. If the seed in the aperture does not fall into the plunger bore 39 under gravitational forces, before the metering aperture passes over the discharge aperture, the arm tip 10 which is tracking in the groove 8 engages the seed and positively urges the same into the seed receiving cavity of the plunger bore.

It is to be understood that while I have illustrated and described certain forms of my invention, it is not to be limited to these specific forms or arrangement of parts herein described and shown.

What is claimed and desired to secure by Letters Patent is:

1. A hopper for a mechanical seed planter, said hopper comprising:
   (a) an upper reservoir shaped for retaining seed therein and including a side wall and a bottom, said bottom having an aperture therethrough;
   (b) a lower reservoir disposed below said upper reservoir, shaped for retaining seed therein, and including a side wall and a bottom; said lower reservoir being rotatably mounted in said hopper, said seed therein rotating substantially with said lower reservoir whereby abrasion to said seeds is minimized; the bottom of said lower reservoir including at least one metering aperture therethrough shaped to receive one of said seeds therein;
   (c) a valve positioned in said upper reservoir bottom aperture, said valve including an arcuately shaped upper portion rotatably mounted in said upper reservoir bottom and having an open position wherein seeds are allowed to flow under gravitational forces from said upper reservoir into said lower reservoir and having a closed position;
   (2) a lower portion integrally connected to said upper portion and extending into said lower reservoir whereby engagement with the seeds therein causes said upper portion to rotate to said closed position;
   (3) means connected to said upper reservoir bottom resiliently urging said valve to rotate to said closed position; and
   (4) said valve being adapted for maintaining the level of seed in said lower reservoir at a height below and spaced apart from said upper reservoir bottom;
   (d) means rotating said lower reservoir with respect to said upper reservoir; and
   (e) a stationary base plate disposed directly below said lower reservoir bottom and including a discharge aperture therethrough which is circumferentially aligned to mate with said metering aperture; whereby rotation of said lower reservoir sequentially aligns said metering and discharge apertures for accurate seed planting without abrading the seeds.

* * * * *